G. B. McDonald,
Making Metal Buckles,
Nº 64,782. Patented May 14, 1867.

WITNESSES

INVENTOR:

United States Patent Office.

G. B. McDONALD, OF NEW ALBANY, INDIANA, ASSIGNOR TO J. BRAGDON AND COMPANY.

Letters Patent No. 64,782, dated May 14, 1867.

IMPROVEMENT IN MAKING BUCKLES.

*The Schedule referred to in these Letters Patent and making part of the same.*

TO ALL WHOM IT MAY CONCERN:

Be it known that I, G. B. McDonald, of New Albany, in the county of Floyd, and in the State of Indiana, have invented certain new and useful Mode of the Manufacture of Metallic Buckles; and do hereby declare that the following is a full, clear, and exact description thereof, reference being had to the accompanying drawings, and to the letters of reference marked thereon.

My invention consists in rolling metallic plates with tongues and groove lengthwise and on the under side of said plates, whereby said plates may be, by being cut transversely at suitable distance and properly punched, formed into buckles or fastenings for cotton-bale ties, as will be set forth. In the annexed drawings—

Figure 1:
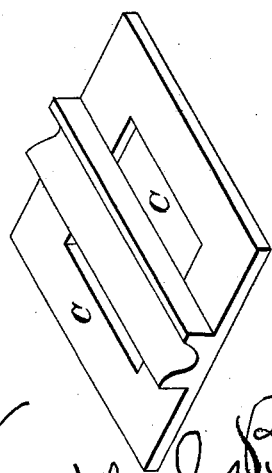

A represents the plate of metal rolled of sufficient thickness and width for forming the buckles, and in any desired length; B B represent two tongues rolled on the under side of the plate, with a groove between them. After the plate is rolled with its tongues and groove, it is cut transversely, as shown in Figure 1, the length it is desired to have the buckle, and two openings are punched through these buckles or parts when cut off, close by the side of the tongues, as seen, and marked C C. The length of the slot or opening C is made in proportion to the size of the buckle, and to the cotton-bale tie, and is made as wide as desirable or as is suitable and convenient.

When metallic plates are rolled in this form, it will readily be seen that the buckle is formed very quickly and easily by two simple operations: one is cutting off, by shears or otherwise, the buckles into suitable lengths, and the other is by punching the slots or openings in them by any of the known and usual ways.

Having thus fully described my invention, what I claim as new, and desire to secure by Letters Patent, is—

Figure 2:
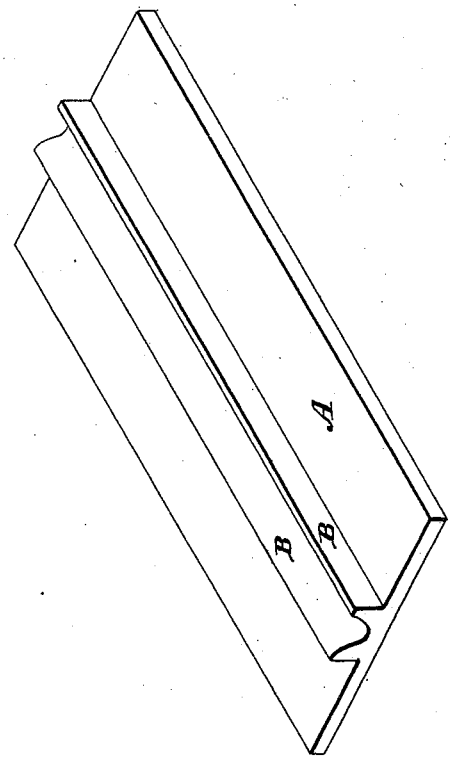

I claim making buckles by first rolling the metal bar to the shape represented in Figure 2, and afterwards dividing and punching the same, all as described.

In testimony that I claim the foregoing I have hereunto set my hand this 12th day of December, 1866.

G. B. McDONALD.

Witnesses:
   C. M. Alexander,
   J. M. Mason.